United States Patent
Hashimoto (10) Patent No.: US 10,200,563 B2
(45) Date of Patent: Feb. 5, 2019

(54) IMAGE PROCESSING APPARATUS AND METHOD OF PROCESSING AN IMAGE

(71) Applicant: Ayumu Hashimoto, Kanagawa (JP)

(72) Inventor: Ayumu Hashimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 90 days.

(21) Appl. No.: 15/437,807

(22) Filed: Feb. 21, 2017

(65) Prior Publication Data

US 2017/0264782 A1 Sep. 14, 2017

(30) Foreign Application Priority Data

Mar. 14, 2016 (JP) .................................. 2016-050280

(51) Int. Cl.
*G06F 15/00* (2006.01)
*H04N 1/387* (2006.01)
*H04N 1/00* (2006.01)
*H04N 1/10* (2006.01)

(52) U.S. Cl.
CPC ......... *H04N 1/387* (2013.01); *H04N 1/00005* (2013.01); *H04N 1/0005* (2013.01); *H04N 1/00013* (2013.01); *H04N 1/00034* (2013.01); *H04N 1/00084* (2013.01); *H04N 1/10* (2013.01); *H04N 1/1043* (2013.01); *H04N 1/3878* (2013.01); *H04N 2201/0081* (2013.01); *H04N 2201/0093* (2013.01); *H04N 2201/0094* (2013.01)

(58) Field of Classification Search
CPC ............... H04N 1/387; H04N 1/00005; H04N 1/00034; H04N 1/00013; H04N 1/0005; H04N 1/00084; H04N 1/10; H04N 1/1043; H04N 1/3878

USPC .......................................................... 358/406
See application file for complete search history.

(56) References Cited

U.S. PATENT DOCUMENTS

| | | | |
|---|---|---|---|
| 7,376,285 B2 * | 5/2008 | Song | G06K 9/3275 382/289 |
| 2014/0146371 A1 * | 5/2014 | Hayashi | H04N 1/506 358/474 |
| 2016/0224873 A1 | 8/2016 | Akiyama | |

FOREIGN PATENT DOCUMENTS

| | | |
|---|---|---|
| JP | 2004-165969 | 6/2004 |
| JP | 2011-171992 | 9/2011 |
| JP | 2012-244383 | 12/2012 |

\* cited by examiner

Primary Examiner — Mark R Milia
(74) Attorney, Agent, or Firm — Harness, Dickey & Pierce, P.L.C.

(57) ABSTRACT

An image processing apparatus includes a reading device and at least one processor. The reading device reads a document into image data of a document image with a first resolution and a second resolution that are different from each other. The first resolution is used for reading the document in a main scanning direction. The second resolution is used for reading the document in a sub-scanning direction perpendicular to the main scanning direction. One or more processors detect an inclination angle of the document image corresponding to inclination of the document, obtain a distortion angle of the document image based on the inclination angle and a ratio between the first resolution and the second resolution, and correct distortion of the document image using the distortion angle.

20 Claims, 3 Drawing Sheets

FIG. 3A

(a) READING IMAGE

ROTATION (INCLINATION CORRECTION)

$$\begin{pmatrix} X' \\ Y' \end{pmatrix} = \begin{pmatrix} \cos\theta & -\sin\theta \\ \sin\theta & \cos\theta \end{pmatrix} \begin{pmatrix} x \\ y \end{pmatrix}$$

(b) AFTER INCLINATION CORRECTION

FIG. 3B (a) READING IMAGE

ROTATION (INCLINATION CORRECTION)

$$\begin{pmatrix} X' \\ Y' \end{pmatrix} = \begin{pmatrix} \cos\theta & -\sin\theta \\ \sin\theta & \cos\theta \end{pmatrix} \begin{pmatrix} x \\ y \end{pmatrix}$$

(b) AFTER INCLINATION CORRECTION

$$\begin{pmatrix} X \\ Y \end{pmatrix} = \begin{pmatrix} 1 & -\tan\theta a \\ 0 & 1 \end{pmatrix} \begin{pmatrix} X' \\ Y' \end{pmatrix}$$

DISTORTION CORRECTION (c) AFTER DISTORTION CORRECTION

IMAGE PROCESSING APPARATUS AND METHOD OF PROCESSING AN IMAGE

CROSS-REFERENCE TO RELATED APPLICATION

This patent application is based on and claims priority pursuant to 35 U.S.C. § 119(a) to Japanese Patent Application No. 2016-050280, filed on Mar. 14, 2016, in the Japan Patent Office, the entire disclosure of which is hereby incorporated by reference herein.

BACKGROUND

Technical Field

Embodiments of the present disclosure relate to an image processing apparatus and a method of processing an image.

Description of the Related Art

An image reading apparatus such as a scanner includes a document feeder that feeds and sets a document, which is to be read, on a glass platen. If the document feeder conveys and sets the document in an inclined state, the image data is slanted. To correct the inclination of the read image, a method of detecting an inclination angle of the read image and correcting the inclination by rotating the read image with the inclination angle is known.

The scanner, however, may use different resolutions to read the image in a main scanning direction and in a sub-scanning direction perpendicular to the main scanning direction. When such a scanner reads the image in the inclined state, the image data is not only slanted but also distorted.

SUMMARY

An image processing apparatus includes a reading device and at least one processor. The reading device reads a document into image data of a document image with a first resolution and a second resolution that are different from each other. The first resolution is used for reading the document in a main scanning direction. The second resolution is used for reading the document in a sub-scanning direction perpendicular to the main scanning direction. One or more processors detect an inclination angle of the document image corresponding to inclination of the document, obtain a distortion angle of the document image based on the inclination angle and a ratio between the first resolution and the second resolution, and correct distortion of the document image using the distortion angle.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Figure 1:
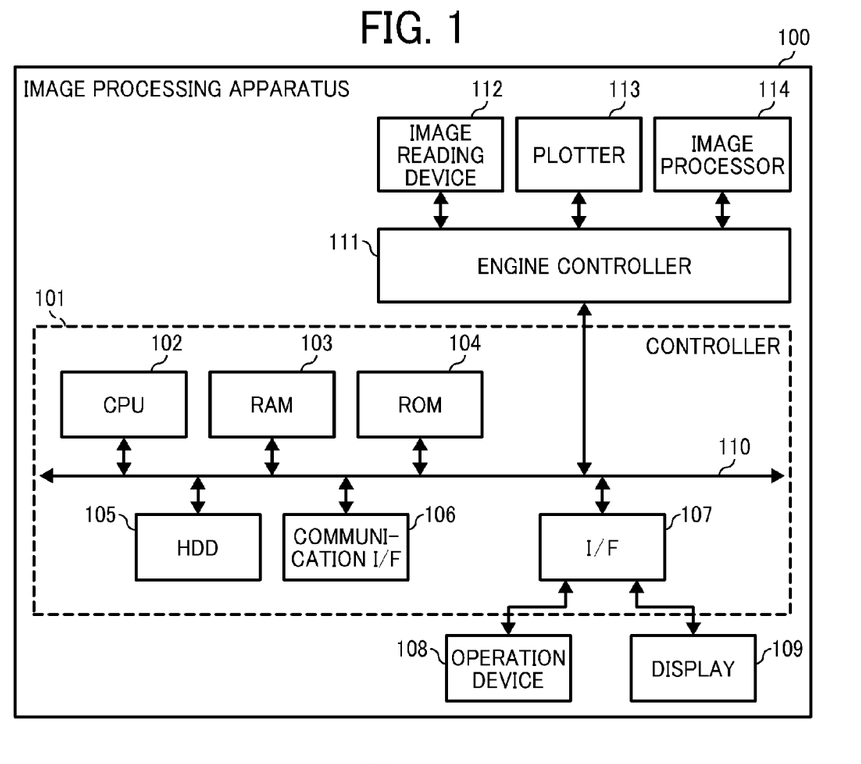
FIG. 1 is a diagram illustrating a hardware configuration of an image processing apparatus according to an embodiment of the present disclosure.

Referring to FIGS. 1 to 4, an image processing apparatus 100 according to a first embodiment is described. FIG. 1 is a diagram illustrating a hardware configuration of the image processing apparatus 100. The image processing apparatus 100 includes a controller 101, an engine controller 111, an image reading device 112, a plotter 113, and one or more image processors 114. The controller 101 includes one or more central processing units (CPU) 102, a random access memory (RAM) 103, a read only memory (ROM) 104, a hard disc drive (HDD) 105, a communication interface (I/F) 106, and an interface (I/F) 107 that is connected to an operation device 108 and a display 109. The above-mentioned elements are connected to each other via a system bus 110.

The CPU 102 has an arithmetic processing function for controlling operation of the image processing apparatus 100. The CPU 102 controls entire operation performed by the image processing apparatus 100 by executing a computer program, which is read from the ROM 104 or the HDD 105, as a main storage device, onto the RAM 103 as a work area, and implements various functions described later. The ROM 104 and HDD 105 are non-volatile storage media (storage units) and stores the various computer programs, which are executed by the CPU 102, and various types of data described later.

The communication I/F 106 is an interface that connects the image processing apparatus 100 with a network, such as the Internet. The communication I/F 106 is implemented by a wireless local area network (LAN), and a near field communication (NFC), but is not limited to,the above-mentioned interfaces, and may use any other suitable interface according to a standard or communication protocol of a communication path employed. The I/F 107 connects the operation device 108 to the system bus 110 and thereby enables the CPU 102 to control the operation device 108.

The operation device 108 includes various keys, buttons, and a touch panel to accept operation from a user. The display 109 displays a graphical user interface (GUI) to report to the user an operational condition of the image processing apparatus 100, configuration setting of the image processing apparatus 100, various messages, and the like. The image reading device 112 reads an image of a document and acquires image data of the document. The plotter 113 forms the image on a recording sheet based on the image data.

The image processor 114 performs image processing including inclination correction and distortion correction, as described later, on the image data, which is read with the image reading device 112 or which is to be used for image forming with the plotter 113. The engine controller 111 controls the image reading device 112, the plotter 113, and the image processor 114 according to commands sent from the CPU 102 through the system bus 110. The engine controller 111 also sends the commands to the CPU 102 from the image reading device 112, the plotter 113, and the image processor 114 through the system bus 110.

The image processing apparatus 100 may be configured with, for example, a scanner, a facsimile, and a digital multifunction peripheral (MFP). The image processing apparatus 100 has a specific function to correct distortion of an image of read image data, which now is described in detail below.

Figure 2:
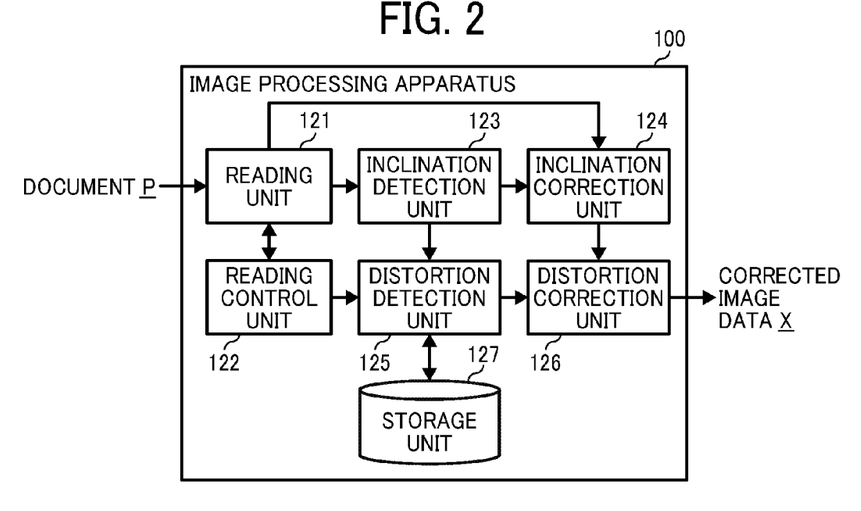
FIG. 2 is a diagram illustrating a functional configuration of the image processing apparatus of FIG. 1.

FIG. 2 is a diagram illustrating a functional configuration of the image processing apparatus 100 for correcting inclination and distortion of a read document image. The image processing apparatus 100 has functions including a reading unit 121, a reading control unit 122, an inclination detection unit 123, an inclination correction unit 124, a distortion detection unit 125, a distortion correction unit 126, and a storage unit 127. Each of these functions is implemented with required hardware illustrated in FIG. 1 and controlled by the CPU 102. The functions of the inclination detection unit 123, the inclination correction unit 124, the distortion detection unit 125, and the distortion correction unit 126 are preferably implemented with the image processor 114 using dedicated processing circuits to increase image processing speed. The reading unit 121 and the reading control unit 122 are implemented by the image reading device 112.

The reading unit 121 controls the image reading device 112 to read a document, which is fed by a document feeder or placed on a document table. The reading is performed with resolutions set separately for a main scanning direction and a sub-scanning direction by the reading control unit 122. The image reading device 112 acquires image data as a result of the reading. The document image, here, is an image corresponding to a whole sheet area of the document included in the all image data (read image) acquired in reading the document. When the document is read in an inclined state, the document image included in the read image, which is the result of the reading, also is in an inclined state in the image data. After reading the document, the reading unit 121 sends the image data of the read image to the inclination detection unit 123 and the inclination correction unit 124.

The reading control unit 122 instructs the reading unit 121 to read the document with the resolutions respectively set for the main scanning direction and the sub-scanning direction by the user, other devices or the like. The inclination detection unit 123 detects an inclination angle of the document image, according to image data received from the reading unit 121. The inclination angle corresponds to the inclination of the document read relative to the main scanning direction. The inclination detection unit 123 then reports the inclination angle to the inclination correction unit 124 and the distortion detection unit 125. The inclination correction unit 124 corrects the inclination of the document image in the image data received from the reading unit 121 based on the inclination angle reported from the inclination detection unit 123. The inclination correction unit 124 then sends the inclination-corrected image data to the distortion correction unit 126.

The distortion detection unit 125 calculates a distortion angle of the document image based on the inclination angle, which is reported from the inclination detection unit 123, and the resolutions for the main scanning direction and the the sub-scanning direction (or a ratio thereof) reported from the reading control unit 122. The distortion detection unit 125 then notifies the distortion correction unit 126 of the distortion angle. The distortion correction unit 126 corrects the distortion of the image data received from the inclination correction unit 124 after the inclination correction based on the distortion angle acquired from the distortion detection unit 125.

More specifically, in operation, the reading unit 121 of the image processing apparatus 100 detects a document P and notifies the reading control unit 122 of the detection of the document P. On receiving the notification, the reading control unit 122 notifies the reading unit 121 and the distortion detection unit 125 of the resolutions respectively for the main scanning direction and the sub-scanning direction of the document for reading, while instructing the reading unit 121 to read the document with the specified resolutions.

Subsequently, the reading unit 121 sends the image data of the read image acquired by reading the document to the inclination detection unit 123 and the inclination correction unit 124. The reading unit 121, in this phase, does not need to cut out the document image from the image data of the read image, but sends the image data of the read image onward. The inclination detection unit 123 detects an inclination angle $\Theta$ of the document image from the received image data (namely, the inclination angle of the document conveyed to the image reading device 112), and notifies the inclination correction unit 124 and the distortion detection unit 125 of the inclination angle $\Theta$. The inclination angle $\Theta$ may be detected as an angle formed between a direction of an edge of a distal end side (side to be read first) of the document image appearing in the image of image data and the main scanning direction in reading (the sub-scanning direction may be replaced with the main scanning direction). The edge is detected by performing edge detection on the image data obtained by reading the document. Other known algorithms may also be appropriately applied to detect the inclination angle $\Theta$.

Subsequently, the inclination correction unit 124, which receives the inclination angle $\Theta$, corrects the inclination by rotating the image data of read image based on the inclination angle $\Theta$ and sends the corrected image data, in which the inclination of the image is corrected, to the distortion correction unit 126. The processing of inclination correction is described later with reference to FIG. 3A. The distortion detection unit 125 obtains the inclination angle $\Theta$ from the inclination detection unit 123 and the resolutions for the main scanning direction and the sub-scanning direction from the reading control unit 122. The distortion detection unit 125 then calculates and acquires a distortion angle $\Theta a$ based on the inclination angle $\Theta$ and a ratio of the resolution of the main scanning direction to the resolution of the sub-scanning direction, and notifies the distortion correction unit 126 of the distortion angle Θa. The embodiment includes a specific method of calculating a distortion angle, which is described later with reference to FIG. 4.

Subsequently, the distortion correction unit 126, which obtains the distortion angle Θa and the corrected image data, corrects the distortion of the corrected image data based on the distortion angle Θa. The processing of distortion correction is described later with reference to FIG. 3B.

By performing the above-mentioned process, corrected image data X in which the inclination and the distortion, which occur when the document is read in an inclined state, are corrected can be obtained. In the description above, the distortion correction is performed after the inclination correction, however the distortion correction and the inclination correction may be performed concurrently. In performing the distortion correction and the inclination correction concurrently, the reading unit 121 may send the image data of the read image to the distortion correction unit 126, and the distortion correction unit 126 may perform both the inclination correction and the distortion correction.

Figure 3A:
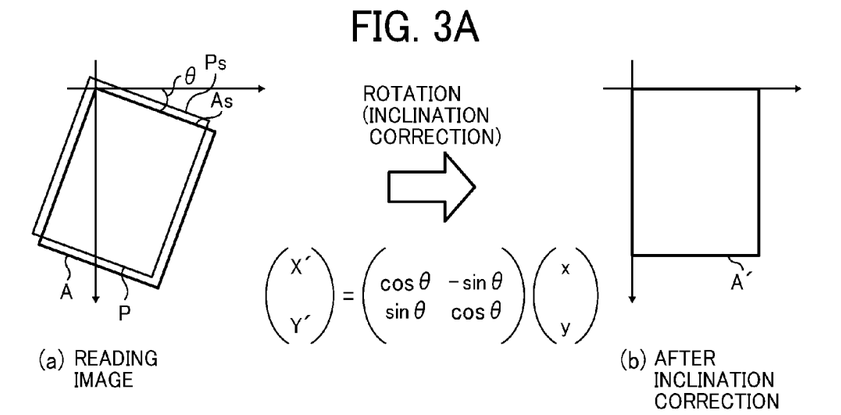
FIG. 3A is an illustration of inclination correction processing performed on a document image when reading resolution in a main scanning direction is the same as reading resolution in a sub-scanning direction.
Figure 3B:
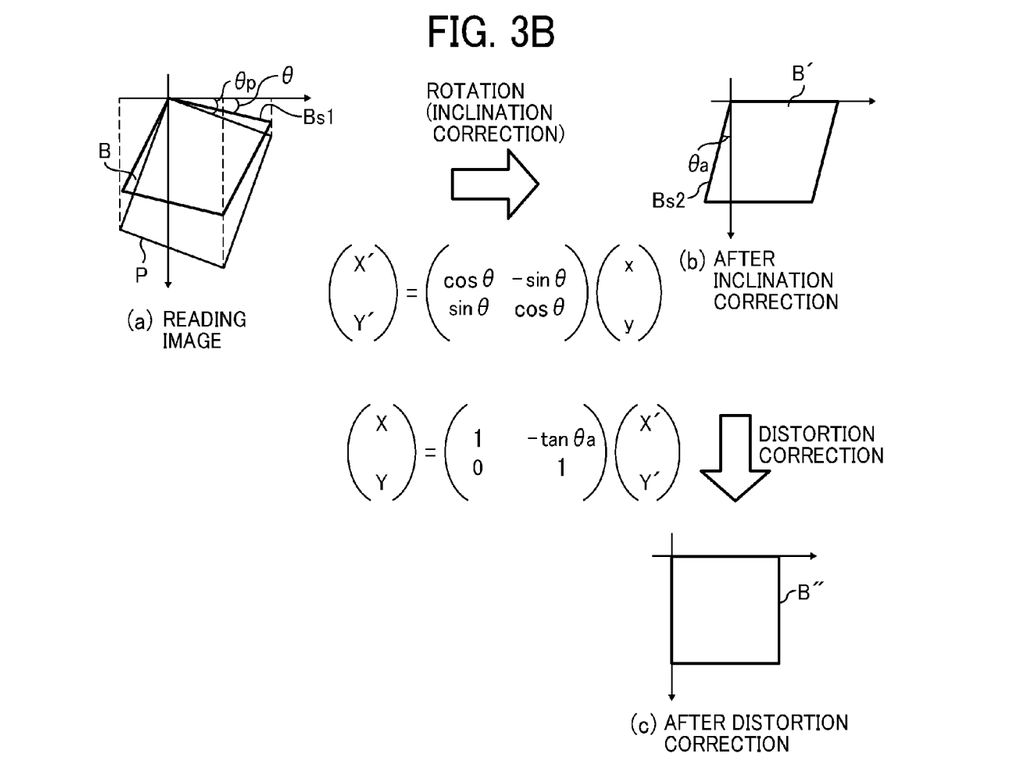
FIG. 3B is an illustration of inclination correction processing performed on a document image when the reading resolution in the main scanning direction is different from the reading resolution in the sub-scanning direction.

The following describes the inclination correction processing and the distortion correction processing with reference to FIG. 3A and FIG. 3B. FIG. 3A is an illustration of one simple example of the inclination correction processing when the same reading resolution is set for the main scanning direction and the sub-scanning direction. In FIG. 3A, the document P is misplaced in such a manner that an upper side (side of the distal edge of the document) Ps is inclined relative to the main scanning direction by the angle Θ. In FIG. 3A, a document image A is a document image of the document P included in the image data that is a result of reading the document P in the above mentioned state. In FIG. 3A, the document P and the document image A are illustrated schematically. A horizontal axis represents the main scanning direction, and a vertical axis represents the sub-scanning direction. When the document P and the document image A each have a direction of side aligned with the main scanning direction or the sub-scanning direction, this means that there is no inclination occurring.

In FIG. 3A, the document image A in the image data is inclined in the same way with the document P, which is an original document, in which an upper side As is inclined relative to the main scanning direction by the angle Θ. In FIG. 3A, the document P and the document image A are intentionally illustrated as not being completely aligned with each other to be able to be viewed easily. As illustrated in FIG. 3A, when the document P is read with the same resolution in both the main scanning direction and the sub-scanning direction, the distortion does not occur and a shape of the document P remains as is even when the document P is read in the inclined state. Additionally, a value of Θ can be obtained with a direction of the upper side As of the document image A by performing the edge detection as described above.

Finally, by rotating the whole image data including the document image A by the angle Θ, a document image A' that matches the document P in being read without the inclination can be obtained. Rotating by the angle Θ can be performed by obtaining a rotated (target) coordinate (X', Y') with coordinate transformation in which a coordinate before rotating (original coordinate) (x, y) is multiplied by a rotation matrix and then moving a pixel located at the coordinate (x, y) to the coordinate (X', Y'). At this time, if the coordinate after moving (target coordinate) does not have integer values, additional processing may be appropriately performed.

FIG. 3B is an illustration of the inclination correction processing when the reading resolution in the main scanning direction is different from the reading resolution in the sub-scanning direction (the sub-scanning direction has smaller resolution than that of the main scanning direction). In FIG. 3B, a document image B is obtained when the document P is read in a state where the upper side of the document P is inclined relative to the main scanning direction by the angle Θp. Under the above-mentioned condition where the resolution of the sub-scanning direction is smaller than the resolution of the main scanning direction, the document image B in the image data is compressed in the sub-scanning direction when being viewed with coordinate values, and has inclination in which an upper side Bs1 is inclined relative to the main scanning direction by the angle Θ that is different from the angle Θp. In addition to that, an angle formed with the adjacent sides is not 90 degree so that the document image B has a shape such as a parallelogram.

In the case of document image B, simply rotating the image data by the inclination angle Θ to make the upper side Bs1 parallel to the main scanning direction to obtain a document image B', to which the inclination correction is performed, is not enough to obtain a document image B" that matches the document P in being read without inclination. That is, further processing for correcting the distortion of the document image B' after the inclination correction is required to change the shape from a substantial parallelogram shape to a substantial rectangular shape to obtain the document image B" that matches the document P in being read without inclination. The processing of rotation correction to rotate with the angle Θ can be performed in the same way with the processing in FIG. 3A. Additionally, the value of Θ can be obtained with a direction of the upper side Bs1 of the document image B, which is detected by the edge detection as well as the case of FIG. 3A.

The distortion correction can be performed by the coordinate transformation using a matrix for correcting the distortion illustrated in FIG. 3B. In the above-mentioned distortion correction, an inclination angle Θa that is an angle formed between a left side Bs2 of the document image B' and the sub-scanning direction is needed. The angle Θa is obtained using a direction of the left side Bs2, which can be detected by the edge detection performed to the document image B'. To detect the direction of the left side Bs2, data corresponding to the more number of lines than the number of lines required to detect the upper side Bs1 is required. This means that the distortion correction cannot be carried out until the required number of lines of data are accumulated.

However, this is improved in the embodiment, and the angle Θa can be obtained based on data corresponding to the less number of lines than the above-mentioned required number of lines. More specifically, the distortion angle Θa can be obtained based on the inclination angle Θ of the document image. This is described in detail below.

Figure 4:
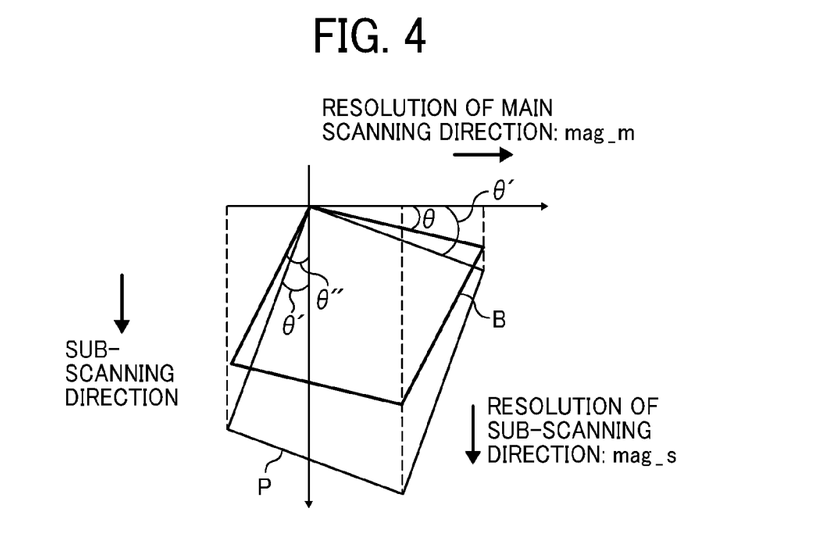
FIG. 4 is an illustration of a method of calculating a distortion angle, performed by an image processing apparatus according to a first embodiment.

FIG. 4 is an illustration of a method of calculating the distortion angle Θa of the document image based on the inclination angle Θ of the document image. In FIG. 4, the document P, which is to be read, and the document image B, which is a result obtained by reading the document P, are illustrated in the same way as in FIG. 3B. In the following description, the resolution of the main scanning direction is indicated by mag_m and the resolution of the sub-sub-scanning direction is indicated by mag_s. Values of mag_m and mag_s may be different from each other, and the following calculation method can also be applied when the values of mag_m and mag_s are the same. In the following description, inclination angle of the document P in reading is Θ' (it is assumed that the document P is misplaced in a manner that its upper side is inclined by the angle Θ' in relation to the main scanning direction when being read).

$$\frac{\sin x}{x} \approx 1 \quad \text{Equation (1)}$$

In Equation (1), x≈0. It is supposed that a value of the inclination angle Θ of the document image B is not so large that the following equation is established by utilizing approximation of Equation (1). Here, mag_s: Θ≈mag_m: Θ' is established and this is applied to obtain Θ'.

$$\theta' \approx \frac{mag\_m}{mag\_s} \times \theta \quad \text{Equation (2)}$$

Regarding the angle Θ" that is formed between the left side of the document image B and the sub-scanning direction, mag_s: Θ'≈mag_m: Θ" is established as well. By developing mag_s: Θ'≈mag_m: Θ in relation to Θ" and assigning and reflecting Equation (2), Equation (3) is obtained.

$$\theta'' \approx \frac{mag\_m}{mag\_s} \times \theta' \approx \frac{mag\_m}{mag\_s} \times \frac{mag\_m}{mag\_s} \theta \quad \text{Equation (3)}$$

It is obvious from FIG. 3B that the distortion Θa can be obtained with an equation of Θa=-Θ"-Θa. By assigning and reflecting Equation (3), Equation (4) can be obtained.

$$\theta a = \theta'' - \theta \approx \left( \frac{mag\_m}{mag\_s} \times \frac{mag\_m}{mag\_s} - 1 \right) \times \theta \quad \text{Equation (4)}$$

With this, the distortion angle Θa can be calculated by using the resolution of the main scanning direction mag_m, the resolution of the sub-scanning direction mag_s, and the inclination angle Θ of the document image B. The distortion detection unit 125 of FIG. 2 calculates the distortion angle Θa according to Equation (4) described above. That is, there is no need to detect the direction of the left side Bs2 of the document image B' to obtain the distortion angle Θa, which is different from the case of FIG. 3B. The inclination angle Θ can be obtained using the data corresponding to fewer lines so that the distortion correction processing can be started at an early time and speed up the processing as a whole.

Still referring to FIGS. 1 and 2, an image processing apparatus 100 according to a second embodiment is described below. The second embodiment is similar to the first embodiment, except for the method of obtaining the distortion angle, and data stored in the storage unit 127. The difference is described below. In the description of the second embodiment, the same symbols are used for elements of configuration common to or corresponding to that of the first embodiment. Additionally, in other embodiments described later, the same symbols are also used for elements of configurations common to or corresponding to that of the first embodiment.

In the image processing apparatus 100 according to the second embodiment, the storage unit 127 stores a table having distortion angle values each corresponding to a different value of inclination angle of the document image for each combination (or ratio) of the resolution of the main scanning direction and the resolution of the sub-scanning direction. The distortion detection unit 125 searches the table based on the inclination angle obtained from the inclination detection unit 123 and the combination (or ratio) of the resolution of the main scanning direction and the resolution of the sub-scanning direction obtained from the reading control unit 122 to acquire the distortion angle that is corresponding to the inclination angle values and the combination (ratio) of the resolutions obtained.

As described above, the image processing apparatus 100 of the disclosure can read the document in the main scanning direction and the sub-scanning direction at different resolutions. This speeds up a time for reading and reduces an amount of memory used. Thus, the possible number of values of the resolution set for the sub-scanning direction are not so many. This means that the amount of memory to be used for storing the table having all of the values that can be supposed and the resolutions is estimated as not so much. Using the table can eliminate a circuit for calculating Equation (4) used by the distortion detection unit 125, resulting in reducing a cost for the image processor 114 that is configured with dedicated hardware.

The following is an example of the table stored in the storage unit 127.

TABLE 1

| Detected Inclination Angle (degree) | Resolution of Main Scanning Direction 600 dpi | | |
|---|---|---|---|
| | Distortion Angle (degree) Resolution of Sub-Scanning Direction | | |
| | 300 dpi | 450 dpi | 600 dpi |
| 0 | 0 | 0 | 0 |
| 0.5 | 1.5 | 0.4 | 0 |
| 1.0 | 3.0 | 0.8 | 0 |
| 1.5 | 4.5 | 1.2 | 0 |
| 2.0 | 6.0 | 1.6 | 0 |
| 2.5 | 7.5 | 1.9 | 0 |
| 3.0 | 9.0 | 2.3 | 0 |
| 3.5 | 10.0 | 2.7 | 0 |
| 4.0 | 12.0 | 3.1 | 0 |
| 4.5 | 13.5 | 3.5 | 0 |
| 5.0 | 15.0 | 3.9 | 0 |
| ... | ... | ... | ... |

In Table 1, each distortion angle value according to the inclination angle are calculated in advance, in which the inclination angle is predicted from the resolution of the main scanning direction that is set to 600 dpi and the resolution of the sub-scanning direction set to one of 300 dpi, 450 dpi, and 600 dpi in relation to the main scanning direction 600 dpi. Here, a range of the inclination angle is 0-degree to 5-degree and each inclination angle is set at 0.5-degree intervals. When data associated with the inclination angle that is not in the table is needed, additional processing may be appropriately performed. Table 1 is just one of the examples and the resolution of the main scanning direction, the resolution of the sub-scanning direction, and the maximum value and setting interval of the inclination angle are not limited to Table 1. Additionally, the resolution of the main scanning direction may not need to be fixed to 600 dpi.

Figure 5A:
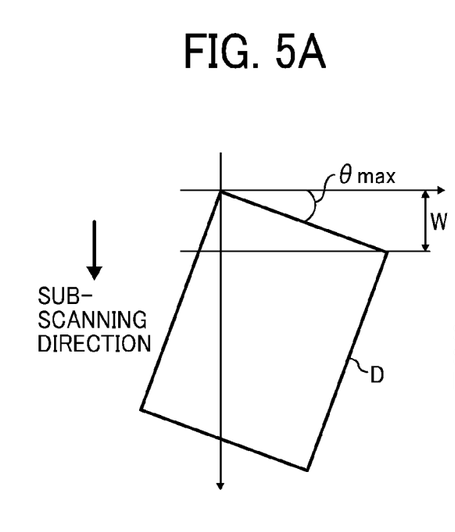
FIGS. 5A and 5B are an illustration of a method of calculating the number of lines required to obtain an inclination angle, which is performed by an image processing apparatus according to an embodiment.
Figure 5B:
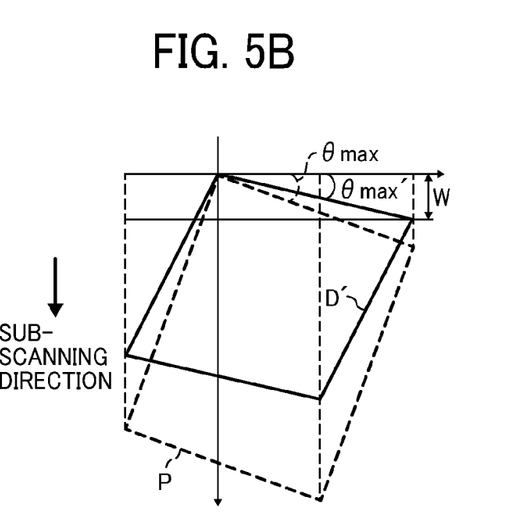

Referring to FIGS. 5A and 5B, an image processing apparatus 100 according to a third embodiment is described below. The third embodiment is different from the first embodiment in that the predetermined number of lines is defined according to a ratio of the resolution of the main scanning direction to the resolution of the sub-scanning direction, for performing the inclination correction and the distortion correction that are started when the predetermined number of lines of image data is acquired in reading the document. Except for the above-mentioned difference, the third embodiment is same as the first embodiment. The difference is described more with reference to FIGS. 5A and 5B below.

The image reading device 112 includes a line sensor. The line sensor of the image reading device 112 reads the image line by line, and the inclination detection unit 123 accumulates the number of lines of image data required for detecting the inclination angle. However, the number of lines required for detecting the inclination angle varies according to the value of the inclination angle. In the third embodiment, an allowable upper limit for the value of the inclination angle of the document is set in advance, and the inclination detection unit 123 starts detecting the inclination when obtaining the number of lines of image data required for detecting the allowable upper limit value of the inclination angle. The inclination correction and the distortion correction can be performed right after the detection of the inclination.

FIG. 5A is a schematic diagram illustrating a document image D in the image data obtained by reading the document P using the same resolution for each of the main scanning direction and the sub-scanning direction, in a state where the document P is inclined by the value of angle Θmax in relation to the main scanning direction. The angle Θmax is the allowable upper limit value of the inclination angle, here. The allowable upper limit value Θmax is defined in advance, for example as 5-degree.

At this time, to detect the inclination angle of the document image, the image data is required to have a range that can include all of the upper side of the document image D. Under the condition where the main scanning direction and the sub-scanning direction have the same resolution, and the inclination angle of the document P is the allowable upper limit Θmax, the inclination angle of the document image in the image data is also Θmax. That is, the number of lines L required to include all of the upper side of the document image D is obtained by Equation (5): L=W sin Θmax, where a width of the document P is equal to W pixels and the inclination angle of the document P is equal to the allowable upper limit Θmax.

FIG. 5B is a schematic diagram illustrating a document image D' in the image data obtained by reading the document P using the different resolutions each for one of the main scanning direction and the sub-scanning direction, in a state where the document P is inclined by the angle Θmax that is an allowable upper limit value of the inclination angle. As described in FIG. 4 and with Equation (2), when the inclination value of the document P is equal to the allowable upper limit value, Θmax, the inclination angle Θmax' of the document image in the image data is obtained by Equation (6).

$$\theta max' = \frac{mag\_s}{mag\_m} \times \theta \quad \text{Equation (6)}$$

Accordingly, when the width of the document P is equal to W pixels and the inclination angle of the document P is the allowable upper limit value Θmax, the number of lines required to include the all of the upper side of the document image D' is obtained by Equation (7).

$$L = W \sin = \frac{mag\_s}{mag\_m} \times \theta max \quad \text{Equation (7)}$$

That is, the value of L can be defined using the ratio of the value of the resolution of the main scanning direction mag_m and the value of the resolution of the sub-scanning direction mag_s, and the allowable upper limit value of the document P. Additionally, the smaller the resolution of the sub-scanning direction is, the smaller the value of L becomes.

In any case, the inclination detection unit 123 can calculate the inclination angle of the document image when obtaining the image data corresponding to the number of lines L. With the third embodiment, the inclination angle can be calculated using the number of lines L of image data right after the number of lines L of data is obtained according to the ratio of the value of the resolution of the main scanning direction mag_m and the value of the resolution of the sub-scanning direction, and then the subsequent processing of the inclination correction and the distortion correction are started. As a result, the processing time can be shortened as a whole. When the resolution of the main scanning direction mag_m is fixed, the smaller the sub-scanning direction is, the earlier the calculation of the inclination angle can be started. In the description above, the image data is required to have a range sufficient to include all of the upper side of the document image D to detect the inclination angle of the document image. However, if a part of the upper side of the document D is enough for detecting the inclination angle of the document image, Equation (5) or Equation (7) may be applied with a length corresponding to the part of the upper side defined as W.

The specific configuration of the apparatuses, the specific sequence of the processes, the data configuration, etc., described in the above embodiments are not limiting of the present disclosure. In the embodiments described above the image processing apparatus 100 is used but is not a limitation of the embodiments and an apparatus having an image function, such as a scanner, a copier, and a facsimile communication device, may be applicable to the embodiments of the disclosure. Additionally, an apparatus that processes image data read by other devices also may be applicable to the embodiment of the disclosure. In such a situation, a printer, a projector, an electronic meeting system, a tablet computer, a smart phone, or a versatile personal computer (PC) is applicable.

Other than an apparatus, the disclosure may be embodied otherwise, such as in a method, a system, and a storage medium storing a computer program for executing the method. For example, a method of processing an image may be provided that includes reading an image with different resolutions each for one of the main scanning direction and the sub-scanning direction, detecting the inclination angle of the image based on the image data obtained by reading, obtaining a distortion angle of the image data based on the inclination angle detected and a ratio of the values of the resolutions each for one of the main scanning direction and the sub-scanning direction, and correcting the inclination and the distortion of the image data concurrently based on the inclination angle and the distortion angle.

Additionally, as one of the embodiments of the present disclosure, a non-transitory recording medium storing software programs is also provided. By executing the software programs using one or more processors or a computer, the functions of the image processing apparatus 100 according to the embodiments (in particular, functions related to the image processing) can be implemented with required hardware controlled by the computer. Such programs may be stored in the ROM or other nonvolatile storage media (e.g., flash memory and EEPROM etc.) pre-installed in the computer. It is also possible to provide those programs by storing in any non-volatile storage medium such as a memory card, CD, DVD, and Blu-ray disc and distributing. By installing those programs stored in the recording media to the computer and executing those programs, the functions described above can be implemented.

Furthermore, it is also possible to download those programs from an external apparatus that includes the recording medium storing those programs or an external apparatus that stores those programs in a storage unit and install those programs in the computer to execute those programs.

Although the exemplary embodiments of the disclosure have been described and illustrated above, such description is not intended that the disclosure be limited to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An image processing apparatus, comprising:
   a scanner configured to read a document into a document image by, for each line of the document,
      reading the line of the document at a first resolution in a main scanning direction, and
      reading the line of the document at a second resolution in a sub-scanning direction perpendicular to the main scanning direction; and
   at least one processor configured to,
      detect an inclination angle of the document image corresponding to inclination of the document associated with conveying the document through the scanner,
      obtain a distortion angle of the document image based on the inclination angle associated with conveying the document through the scanner and a ratio between the first resolution of the main scanning direction and the second resolution of the sub-scanning direction, the distortion angle of the document image being an angle between a side of the document image and the sub-scanning direction that varies according to a read state and results in a distortion between the document and the document image representing same, and
      correct the distortion of the document image using the distortion angle.

2. The image processing apparatus of claim 1 wherein the at least one processor further configured to correct inclination of the document image by rotating the document image using the inclination angle.

3. The image processing apparatus of claim 1, further comprising:
   a memory configured to store a plurality of distortion angle values each corresponding to one of multiple combinations of an inclination angle of the document image and a set of a first resolution for the main scanning direction and a second resolution for the sub-scanning direction,
   wherein the at least one processor obtains the distortion angle by referring to the memory.

4. The image processing apparatus of claim 2, further comprising,
   a memory configured to store a plurality of distortion angle values each corresponding to one of multiple combinations of an inclination angle of the document image and a set of a first resolution for the main scanning direction and a second resolution for the sub-scanning direction,
   wherein the at least one processor obtains the distortion angle by referring to the memory.

5. The image processing apparatus of claim 1, wherein the at least one processor detects the inclination angle from image data corresponding to a number of lines of the image data obtained by the scanner, the number of lines being determined based on the ratio between the first resolution of the main scanning direction and the second resolution of the sub-scanning direction.

6. The image processing apparatus of claim 2, wherein the at least one processor detects the inclination angle from image data corresponding to a number of lines of the image data obtained by the scanner, the number of lines being determined based on the ratio between the first resolution of the main scanning direction and the second resolution of the sub-scanning direction.

7. The image processing apparatus of claim 3, wherein the at least one processor detects the inclination angle from image data corresponding to a number of lines of the image data obtained by the scanner, the number of lines being determined based on the ratio between the first resolution of the main scanning direction and the second resolution of the sub-scanning direction.

8. The image processing apparatus of claim 4, wherein the at least one processor detects the inclination angle from image data corresponding to a number of lines of the image data obtained by the scanner, the number of lines being determined based on the ratio between the first resolution of the main scanning direction and the second resolution of the sub-scanning direction.

9. The image processing apparatus of claim 5 wherein the at least one processor determines the number of lines of the image data based at least on an allowable upper limit value of the inclination angle of the document to be read and the ratio between the first resolution of the main scanning direction and the second resolution of the sub-scanning direction.

10. A method of processing an image comprising:
    reading, via a scanner, a document into a document image by, for each line of the document,
       reading the line of the document at a first resolution in a main scanning direction, and
       reading the line of the document at a second resolution in a sub-scanning direction perpendicular to the main scanning direction;
    detecting an inclination angle of the document image corresponding to inclination of the document associated with conveying the document through the scanner;
    obtaining a distortion angle of the document image based on the inclination angle associated with conveying the document through the scanner and a ratio between the first resolution of the main scanning direction and the second resolution of the sub-scanning direction, the distortion angle of the document image being an angle between a side of the document image and the sub-scanning direction that varies according to a read state and results in a distortion between the document and the document image representing same; and correcting the distortion of the document image using the distortion angle.

11. The method of processing an image of claim 10, further comprising:

correcting an inclination of the document image by rotating the document image using the inclination angle.

12. The method of claim 11, wherein the correcting the distortion and the correcting the inclination are performed concurrently.

13. The method of processing an image of claim 10, further comprising:

obtaining the distortion angle by referring to a memory storing distortion angle values each corresponding to one of multiple combinations of the inclination angle of the document image and a set of resolutions each for one of the main scanning direction and the sub-scanning direction.

14. The method of processing an image of claim 11, further comprising:

obtaining the distortion angle by referring to a memory storing distortion angle values each corresponding to one of multiple combinations of the inclination angle of the document image and a set of resolutions each for one of the main scanning direction and the sub-scanning direction.

15. The method of processing an image of claim 10, further comprising:

detecting the inclination angle from image data corresponding to a number of lines of the image data obtained by reading, wherein the number of lines is based on the ratio between the first resolution of the main scanning direction and the second resolution of the sub-scanning direction.

16. The method of processing an image of claim 12, further comprising:

detecting the inclination angle from image data corresponding to a number of lines of the image data obtained by reading, wherein the number of lines is based on the ratio between the first resolution of the main scanning direction and the second resolution of the sub-scanning direction.

17. The method of processing an image of claim 13, further comprising:

detecting the inclination angle from image data corresponding to a number of lines of the image data obtained by reading, wherein the number of lines is based on the ratio between the first resolution of the main scanning direction and the second resolution of the sub-scanning direction.

18. The method of processing an image of claim 14, further comprising:

detecting the inclination angle from image data corresponding to a number of lines of the image data obtained by reading, wherein the number of lines is based on the ratio between the first resolution of the main scanning direction and the second resolution of the sub-scanning direction.

19. The method of processing an image of claim 15, further comprising:

determining the number of lines of the image data based at least on an allowable upper limit value of the inclination angle of the document to be read and the ratio between the first resolution of the main scanning direction and the second resolution of the sub-scanning direction, the allowable upper limit value being set in advance.

20. A non-transitory recording medium storing a plurality of instructions which, when executed by one or more processors, cause the one or more processors to perform a method of processing an image, comprising:

reading, via a scanner, a document into a document image by, for each line of the document,
    reading the line of the document at a first resolution in a main scanning direction, and
    reading the line of the document at a second resolution in a sub-scanning direction perpendicular to the main scanning direction;

detecting an inclination angle of the document image corresponding to inclination of the document associated with conveying the document through the scanner;

obtaining a distortion angle of the document image based on the inclination angle associated with conveying the document through the scanner and a ratio between the first resolution of the main scanning direction and the second resolution of the sub-scanning direction, the distortion angle of the document image being an angle between a side of the document image and the sub-scanning direction that varies according to a read state and results in a distortion between the document and the document image representing same; and correcting the distortion of the document image using the distortion angle.

* * * * *